US012484626B2

(12) United States Patent
Courbat et al.

(10) Patent No.: US 12,484,626 B2
(45) **Date of Patent: *Dec. 2, 2025**

(54) AEROSOL GENERATING SYSTEM WITH MULTIPLE SUSCEPTORS

(71) Applicant: Philip Morris Products S.A., Neuchatel (CH)

(72) Inventors: Jerome Christian Courbat, Cortaillod (CH); Oleg Mironov, Cudrefin (CH); Tony Reevell, London (GB); Andreas Michael Rossoll, Le Mont-sur-Lausanne (CH); Enrico Stura, Palezieux-Village (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,163

(22) Filed: May 20, 2024

(65) Prior Publication Data

US 2024/0423278 A1 Dec. 26, 2024

Related U.S. Application Data

(60) Continuation of application No. 18/060,908, filed on Dec. 1, 2022, now Pat. No. 12,016,394, which is a
(Continued)

(30) Foreign Application Priority Data

Aug. 9, 2017 (EP) .................................... 17185595

(51) Int. Cl.
*A24F 13/00* (2006.01)
*A24F 40/465* (2020.01)
(Continued)

(52) U.S. Cl.
CPC ............ *A24F 40/465* (2020.01); *A24F 40/50* (2020.01); *A24F 40/57* (2020.01); *H05B 6/06* (2013.01);
(Continued)

(58) Field of Classification Search
CPC ....................................................... A24F 47/00
(Continued)

(56) References Cited

U.S. PATENT DOCUMENTS

| | | | | |
|---|---|---|---|---|
| 9,999,255 | B2 * | 6/2018 | Li | H05B 1/0244 |
| 10,405,584 | B2 * | 9/2019 | Chen | H05B 6/105 |

(Continued)

FOREIGN PATENT DOCUMENTS

| | | | |
|---|---|---|---|
| CN | 203762288 | U | 8/2014 |
| CN | 104095291 | A | 10/2014 |

(Continued)

OTHER PUBLICATIONS

International Search Report and Written Opinion issued on Nov. 23, 2018, in PCT/EP2018/071692 filed on Aug. 9, 2018.
(Continued)

*Primary Examiner* — Phuong K Dinh
(74) *Attorney, Agent, or Firm* — Oblon, McClelland, Maier & Neustadt, L.L.P.

(57) ABSTRACT

An aerosol-generating system is provided, including: an aerosol-generating device, including a housing including ventilation holes, a heating chamber defining a heating zone and being sized to receive at least a portion of an aerosol-forming substrate within the heating zone, an induction element disposed around, or adjacent to, the heating zone, a power supply, and a controller connected to the induction element and configured to provide an alternating electric current to the induction element to generate an alternating magnetic field within the heating zone, the induction ele-
(Continued)

ment being configured to be controlled to sequentially provide a first alternating magnetic field having a first frequency for a first period of time followed by a second alternating magnetic field having a second frequency for a second period of time.

15 Claims, 7 Drawing Sheets

Related U.S. Application Data division of application No. 16/636,533, filed as application No. PCT/EP2018/071692 on Aug. 9, 2018, now Pat. No. 11,793,239.

(51) Int. Cl.
*A24F 40/50* (2020.01)
*A24F 40/57* (2020.01)
*H05B 6/06* (2006.01)
*H05B 6/10* (2006.01)
*H05B 6/44* (2006.01)
*A24F 40/20* (2020.01)

(52) U.S. Cl.
CPC ............... *H05B 6/108* (2013.01); *H05B 6/44* (2013.01); *A24F 40/20* (2020.01)

(58) Field of Classification Search
USPC .................................................. 131/328–329
See application file for complete search history.

(56) References Cited

U.S. PATENT DOCUMENTS

| | | | | |
|---|---|---|---|---|
| 11,793,239 | B2 * | 10/2023 | Courbat | A24F 40/50 |
| 12,016,394 | B2 * | 6/2024 | Courbat | A24F 40/50 |
| 2015/0282525 | A1 | 10/2015 | Plojoux et al. | |
| 2015/0320116 | A1 | 11/2015 | Bleloch et al. | |
| 2016/0295921 | A1 | 10/2016 | Mironov et al. | |
| 2017/0055580 | A1 | 3/2017 | Blandino et al. | |
| 2017/0055583 | A1 | 3/2017 | Blandino et al. | |
| 2017/0188634 | A1 | 7/2017 | Plojoux et al. | |
| 2018/0184713 | A1 | 7/2018 | Mironov et al. | |
| 2018/0310622 | A1 | 11/2018 | Mironov et al. | |
| 2019/0182909 | A1 * | 6/2019 | Fursa | A24F 40/465 |
| 2020/0375255 | A1 | 12/2020 | Courbat | |

FOREIGN PATENT DOCUMENTS

| | | | |
|---|---|---|---|
| CN | 204949521 | U | 1/2016 |
| CN | 205233455 | U | 5/2016 |
| CN | 205648910 | U | 10/2016 |
| CN | 106163306 | A | 11/2016 |
| CN | 106418703 | A | 2/2017 |
| CN | 106617325 | A | 5/2017 |
| CN | 206 227 716 | U | 6/2017 |
| EP | 2 609 821 | A1 | 7/2013 |
| EP | 3 621 465 | A1 | 3/2020 |
| JP | 2016-532432 | A | 10/2016 |
| RU | 2 618 436 | C2 | 5/2017 |
| WO | WO 95/27411 | A1 | 10/1995 |
| WO | WO 2014/048745 | A1 | 4/2014 |
| WO | WO 2014/066730 | A1 | 5/2014 |
| WO | WO 2015/131058 | A1 | 9/2015 |
| WO | WO 2015/175568 | A1 | 11/2015 |
| WO | WO 2015/176898 | A1 | 11/2015 |
| WO | WO 2015/177043 | A1 | 11/2015 |
| WO | WO 2015/177044 | A1 | 11/2015 |
| WO | WO 2015/177045 | A1 | 11/2015 |
| WO | WO 2015/177046 | A1 | 11/2015 |
| WO | WO 2015/177247 | A1 | 11/2015 |
| WO | WO 2015/177252 | A1 | 11/2015 |
| WO | WO 2015/177253 | A1 | 11/2015 |
| WO | WO 2015/177254 | A1 | 11/2015 |
| WO | WO 2015/177257 | A1 | 11/2015 |
| WO | WO 2015/177263 | A1 | 11/2015 |
| WO | WO 2015/177264 | A1 | 11/2015 |
| WO | WO 2015/177265 | A1 | 11/2015 |
| WO | WO 2015/177294 | A | 11/2015 |
| WO | WO 2015/198015 | A1 | 12/2015 |
| WO | WO 2016/075436 | A1 | 5/2016 |
| WO | WO 2016/090037 | A1 | 6/2016 |
| WO | WO 2016/156500 | A1 | 10/2016 |
| WO | WO 2016/184928 | A1 | 11/2016 |
| WO | WO 2016/184929 | A1 | 11/2016 |
| WO | WO 2016/184930 | A1 | 11/2016 |
| WO | WO 2017/001818 | A1 | 1/2017 |
| WO | WO 2017/001819 | A1 | 1/2017 |
| WO | WO 2017/001820 | A1 | 1/2017 |
| WO | WO 2017/005705 | A1 | 1/2017 |
| WO | WO 2017/029268 | A1 | 2/2017 |
| WO | WO 2017/029269 | A1 | 2/2017 |
| WO | WO 2017/029270 | A1 | 2/2017 |
| WO | WO 2017/036950 | A2 | 3/2017 |
| WO | WO 2017/036951 | A1 | 3/2017 |
| WO | WO 2017/036954 | A1 | 3/2017 |
| WO | WO 2017/036955 | A2 | 3/2017 |
| WO | WO 2017/036957 | A1 | 3/2017 |
| WO | WO 2017/036958 | A2 | 3/2017 |
| WO | WO 2017/036959 | A1 | 3/2017 |
| WO | WO 2017/064487 | A1 | 4/2017 |
| WO | WO 2017/068092 | A1 | 4/2017 |
| WO | WO 2017/068094 | A1 | 4/2017 |
| WO | WO 2017/068095 | A1 | 4/2017 |
| WO | WO 2017/068098 | A1 | 4/2017 |
| WO | WO 2017/068099 | A1 | 4/2017 |
| WO | WO 2017/068100 | A1 | 4/2017 |
| WO | WO 2017/072144 | A1 | 5/2017 |
| WO | WO 2017/072145 | A1 | 5/2017 |
| WO | WO 2017/072148 | A1 | 5/2017 |
| WO | WO 2017/072149 | A1 | 5/2017 |
| WO | WO 2017/077503 | A1 | 5/2017 |
| WO | WO 2017/085242 | A1 | 5/2017 |
| WO | WO 2017/118553 | A1 | 7/2017 |
| WO | WO 2018/073376 | A1 | 4/2018 |
| WO | WO 2018/206616 | | 11/2018 |

OTHER PUBLICATIONS

Combined Russian Federation Office Action and Search Report issued Nov. 18, 2021 in Russian Federation Patent Application No. 2020109665/03(015941) (with English translation), 14 pages.

Official Action and Search Report dated Oct. 8, 2022, issued in corresponding Chinese patent application No. 201880047376.4 (with English translation).

Notice of Reasons for Rejection mailed on Oct. 11, 2022 issued in Japanese Application 2020-506925 filed on Aug. 9, 2018, with translation, total 9 pages.

Korean Office Action issued Nov. 24, 2022 in Korean Patent Application 10-2020-7006258 (with English language translation), 15 pages.

* cited by examiner

AEROSOL GENERATING SYSTEM WITH MULTIPLE SUSCEPTORS

CROSS-REFERENCE TO RELATED APPLICATIONS

This application is a continuation of and claims benefit under 35 U.S.C. § 120 to U.S. application Ser. No. 18/060,908, filed Dec. 1, 2022, which is a divisional of and claims benefit under 35 U.S.C. § 120 to U.S. application Ser. No. 16/636,533, filed Feb. 4, 2020 (now U.S. Pat. No. 11,793,239), which is a U.S. National Stage application of PCT/EP2018/071692, filed on Aug. 9, 2018, which is based upon and claims the benefit of priority under 35 U.S.C. § 119 from European Patent Application No. 17185595.0, filed on Aug. 9, 2017, the entire contents of each of which are incorporated herein by reference.

TECHNICAL FIELD

The present invention relates to an aerosol-generating device. In particular, the invention relates to an aerosol-generating device having an inductive heater for heating an aerosol-generating article using a susceptor. The present invention also relates to an aerosol-generating system including such an aerosol-generating device in combination with an aerosol-generating article for use with the aerosol-generating device.

DESCRIPTION OF THE RELATED ART

A number of electrically operated aerosol-generating systems in which an aerosol-generating device having an electric heater is used to heat an aerosol-forming substrate, such as a tobacco plug, have been proposed in the art. One aim of such aerosol-generating systems is to reduce known harmful smoke constituents of the type produced by the combustion and pyrolytic degradation of tobacco in conventional cigarettes. Typically, the aerosol-generating substrate is provided as part of an aerosol-generating article which is inserted into a chamber or cavity in the aerosol-generating device. In some known systems, to heat the aerosol-forming substrate to a temperature at which it is capable of releasing volatile components that can form an aerosol, a resistive heating element such as a heating blade is inserted into or around the aerosol-forming substrate when the aerosol-generating article is received in the aerosol-generating device. In other aerosol-generating systems, an inductive heater is used rather than a resistive heating element. The inductive heater typically comprises an inductor forming part of the aerosol-generating device and a conductive susceptor element arranged such that it is in thermal proximity to the aerosol-forming substrate. During use, the inductor generates an alternating magnetic field to generate eddy currents and hysteresis losses in the susceptor element, causing the susceptor element to heat up, thereby heating the aerosol-forming substrate.

In known systems having an inductor and a conductive susceptor element, the susceptor element is typically fixed within the chamber of the aerosol-generating device and configured such that it extends at least partially into an aerosol-generating article received in the cavity. The susceptor element heats the aerosol-forming substrate of the aerosol-generating article from within when energised by the inductor coil. For example, the susceptor element may be arranged to penetrate the aerosol-forming substrate of the aerosol-generating article when the aerosol-generating article is received in the chamber.

It would be desirable to provide an aerosol-generating device with improved heat distribution when heating an aerosol-generating article.

SUMMARY

According to a first aspect of the present invention, there is provided an aerosol-generating system comprising: an aerosol-generating device, the aerosol-generating device having a housing, a heating chamber defining a heating zone, the heating chamber sized to receive at least a portion of an aerosol-forming substrate within the heating zone, an induction element disposed around, or adjacent to, the heating zone, a power supply, and a controller connected to the induction element and configured to provide an alternating electric current to the induction element to generate an alternating magnetic field within the heating zone. The induction element can be controlled to sequentially provide a first alternating magnetic field having a first frequency for a first period of time followed by a second alternating magnetic field having a second frequency for a second period of time.

The invention is further described, by way of example only, with reference to the accompanying drawings in which:

DETAILED DESCRIPTION

Figure 1:
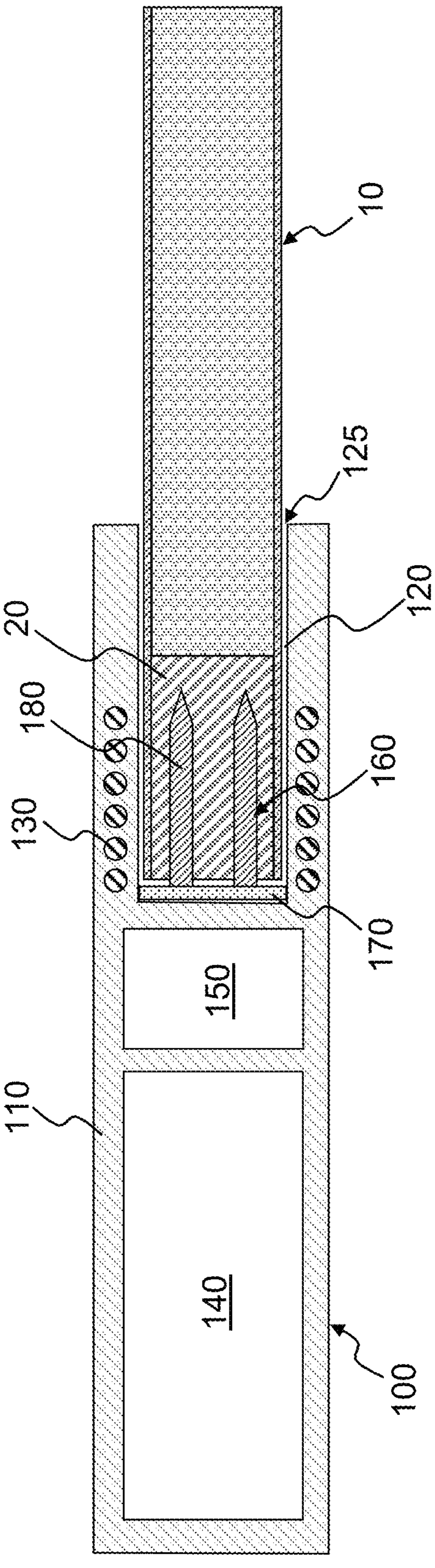
FIG. 1 is a schematic cross-sectional illustration of an aerosol-generating system in accordance with a first embodiment of the present invention.

Advantageously, in use the first alternating magnetic field may cause preferential heating of a first susceptor located within the heating zone and the second alternating magnetic field may cause preferential heating of a second susceptor located within the heating zone. The result of this may be that, during the first period of time the first susceptor is heated to a higher temperature than the second susceptor and, during the second period of time the second susceptor is heated to a higher temperature than the first susceptor. Thus, while both first and second susceptor may be heated simultaneously, during the first period of time the first alternating current may couple with the first susceptor more efficiently that to the second susceptor, with the result that the temperature of the first susceptor is greater than that of the second susceptor for the first period of time. Alternatively, the second alternating magnetic field may cause preferential heating of a first susceptor located within the heating zone and the first alternating magnetic field may cause preferential heating of a second susceptor located within the heating zone. The result of this may be that, during the first period of time the second susceptor is heated to a higher temperature than the first susceptor and, during the second period of time the first susceptor is heated to a higher temperature than the second susceptor.

An alternating magnetic field having any specific frequency will produce a different inductive behaviour in different types of susceptor. For example, if the first and the second susceptor have different physical dimensions then their behaviour may differ when located within an alternating magnetic field, and one or other of the susceptors may heat to a higher temperature than the other of the susceptors. Likewise, inductive behaviour may differ if the shape of the first and second susceptor is different. Likewise, inductive behaviour may differ if the material of the first and second susceptor is different, for example if the resistivity or magnetic permeability of the first and second susceptor differs.

The first susceptor may have a first shape, a first cross-section, a first length dimension, a first width dimension, and a first thickness dimension and the second susceptor may have a second shape, a second cross-section, a second length dimension, a second width dimension, and a second thickness dimension, wherein at least one of the first and second shape, first and second cross-section, first and second length dimension, first and second width dimension, and first and second thickness dimension are different. More than one of the first and second shape, first and second cross-section, first and second length dimension, first and second width dimension, and first and second thickness dimension may be different.

The first susceptor may have a shape selected from the list consisting of rod-shaped, pin-shaped, tubular, blade-shaped, sheet, or particular, and the second susceptor may have a shape selected from the list consisting of rod-shaped, pin-shaped, tubular, blade-shaped, sheet, or particular, the shape of the second susceptor being different from the shape of the first susceptor.

The first susceptor may have a cross-section selected from the list consisting of circular, oval, square, rectangular, and triangular, and the second susceptor may have a cross-section selected from the list consisting of circular, oval, square, rectangular, and triangular, the cross-section of the second susceptor being different from the shape of the first susceptor.

The first susceptor may be formed from a first material and the second susceptor may be formed from a second material, wherein the first material has one or more material properties different from the second material. The one or more properties may include a resistivity of the material and a magnetic permeability of the material.

The first susceptor may have a material selected from the list consisting of iron-alloy, stainless steel, aluminium, nickel, nickel alloy, graphite, or carbon and the second susceptor may have a material selected from the list consisting of iron-alloy, stainless steel, aluminium, nickel, nickel alloy, graphite, or carbon, the material of the second susceptor being different from the shape of the first susceptor. The first susceptor and second susceptor may be formed from different compositions of the same alloy, for example different compositions of stainless steel, particularly where a material property such as resistivity or magnetic permeability differs as a result of the different composition.

By selecting different parameters the first and second susceptors can be optimised for heating in alternating magnetic fields of different frequencies. This may allow the aerosol-generating system to operate with two different susceptors, each optimised for heating in an alternating magnetic field of a different frequency.

If, when the aerosol-generating device is operated, the temperature of the first susceptor is great enough to aerosolise material from the aerosol-forming substrate whereas the temperature of the second susceptor is not great enough to aerosolise material from the aerosol-forming substrate, then a portion of the aerosol-forming substrate located closer to the first susceptor may be preferentially aerosolised during the first time period. Thus, by operating the device to generate a first alternating magnetic field having a first frequency to preferentially heat initially a first susceptor relative to a second susceptor, and subsequently generating a second alternating magnetic field having a second frequency to preferentially heat the second susceptor relative to the second susceptor, sequential heating of different portions of the aerosol-forming substrate may be achieved. Sequential heating may beneficially allow for optimised delivery of an aerosol to a user over the duration of a smoking experience.

One of the first or second susceptor may be associated with, and intended to heat, a first aerosol-forming substrate and the other of the first or second susceptor may be associated with, and intended to heat, a second aerosol-forming substrate.

Further, the frequency of the alternating magnetic field may be modulated between the first frequency and the second frequency to optimise heating of an aerosol-forming substrate during consumption.

A method of consuming an aerosol-generating article comprising an aerosol-forming substrate using an aerosol-generating system as described above may comprise the steps of; inserting the aerosol-generating article into the heating chamber of the aerosol-generating device such that at least a portion of an aerosol-forming substrate is located within the heating zone, actuating the induction element to provide a first alternating magnetic field having a first frequency for a first period of time, thereby preferentially heating a first susceptor located within the heating zone for the first period of time, and actuating the induction element to provide a second alternating magnetic field having a second frequency for a second period of time, thereby preferentially heating a second susceptor located within the heating zone for the second period of time. A first portion of the aerosol-forming substrate is heated by the first susceptor during the first period of time and a second portion of the aerosol-forming substrate is heated by the second susceptor during the second period of time.

In some embodiments, the induction element may be controlled to provide three or more different alternating magnetic fields for three or more separate periods of time, each of the three or more magnetic fields having a different frequency. Thus, three or more susceptors may be preferentially heated by each of the three or more different alternating magnetic fields. Thus, sequential heating of three or more zones in the aerosol-forming substrate may be achieved. Further, modulation of the frequency may allow optimised heating of the three or four zones of the aerosol-forming substrate.

In some embodiments of the aerosol-generating system, the aerosol-generating device may comprise the first susceptor and the second susceptor. That is, the first and second susceptor may be a component part of the aerosol-generating device. Such susceptors may, for example, extend into or be associated with the heating chamber of the aerosol-generating device. The aerosol-generating device may comprise a plurality of elongate susceptor elements projecting into the heating chamber, the plurality of elongate susceptor elements extending in a longitudinal direction of the heating chamber and being spaced apart from each other, the plurality of elongate susceptor elements comprising at least the first susceptor and the second susceptor.

The plurality of elongate susceptor elements may be substantially parallel with each other. The first and second susceptor elements, or each of the plurality of elongate susceptor elements, may be removably attached to the aerosol-generating device. The aerosol-generating system may comprise first and second susceptor elements, or the plurality of elongate susceptor elements, and a base portion configured to removably attach to the housing of the aerosol-generating device. The first and second susceptor elements, or the plurality of elongate susceptor elements, may be attached to the base portion such that the first and second susceptor elements, or the plurality of elongate susceptor elements, project into the heating chamber when the base portion is removably coupled to the housing.

Preferably, the aerosol-generating system comprises the aerosol generating device and an aerosol-generating article, the aerosol-generating article comprising the aerosol-forming substrate and being dimensioned to be received by the heating chamber such that at least a portion of an aerosol-forming substrate is within the heating zone. The aerosol-generating article may comprise the first susceptor and the second susceptor. That is, the first susceptor and the second susceptor may be component parts of the aerosol-generating article arranged to heat the aerosol-forming substrate.

Irrespective of whether the susceptors are located in the aerosol-generating device or the aerosol-generating article, the first susceptor may have a first shape and the second susceptor may have a second shape different from the first shape. The first susceptor may have a first cross-section and the second susceptor may have a second cross-section different from the first cross-section. For example, the first susceptor may be shaped as an elongated blade having a rectangular cross-section and the second susceptor may be shaped as an elongate tube having a circular cross-section. The first susceptor may have different dimensions to the second susceptor.

The first susceptor may be formed from a first material and the second susceptor may be formed from a second material different from the first material. For example the first material may a magnetic material and the second material may be a non-magnetic material. The first material may have a first resistivity and the second material may have a second resistivity different to the first resistivity. The first susceptor may be an iron-based material such as a stainless steel, and the second susceptor may be a carbon material or an aluminium material.

The induction element may be a single coil configured to provide both the first alternating magnetic field and the second alternating magnetic field. The controller may control parameters to determine whether the single coil produces the first alternating magnetic field or the second alternating magnetic field.

The induction element may comprise at least a first coil and a second coil. The first coil may be actuatable to provide the first alternating magnetic field and the second coil may be actuatable to provide the second alternating magnetic field. The controller may control whether the first coil or the second coil is actuated to produce either the first alternating magnetic field or the second alternating magnetic field.

In an alternate aspect an aerosol-generating device may comprise: a housing having a chamber sized to receive at least a portion of an aerosol-generating article; a plurality of elongate susceptor elements projecting into the chamber; an inductor coil disposed around at least a portion of the chamber; and a power supply and a controller connected to the inductor coil and configured to provide an alternating electric current to the inductor coil such that, in use, the inductor coil generates an alternating magnetic field to heat the plurality of elongate susceptor elements and thereby heat at least a portion of an aerosol-generating article received in the chamber. The plurality of elongate susceptor elements extend in a longitudinal direction of the chamber and are spaced apart from each other.

The aerosol-generating device of this alternate aspect may be used in an aerosol-generating system as described anywhere above. The following preferred features may relate to both the aerosol-generating system described above and to the alternate aspect of the aerosol generating device.

As used herein, the term 'longitudinal' is used to describe the direction along the main axis of the aerosol-generating device, of the aerosol-generating article, or of a component of the aerosol-generating device or an aerosol-generating article, and the term 'transverse' is used to describe the direction perpendicular to the longitudinal direction. The heating chamber may sometimes be referred to simply as the "chamber". When referring to the chamber, the term 'longitudinal' refers to the direction in which an aerosol-generating article is inserted into the chamber and the term 'transverse' refers to a direction perpendicular to the direction in which an aerosol-generating article is inserted into the chamber.

Generally, the chamber will have an open end in which an aerosol-generating article is inserted, and a closed end opposite the open end. In such embodiments, the longitudinal direction is the direction extending between the open and closed ends. In certain embodiments, the longitudinal axis of the chamber is parallel with the longitudinal axis of the aerosol-generating device. For example, where the open end of the chamber is positioned at the proximal end of the aerosol-generating device. In other embodiments, the longitudinal axis of the chamber is at an angle to the longitudinal axis of the aerosol-generating device, for example transverse to the longitudinal axis of the aerosol-generating device. For example, where the open end of the chamber is positioned along one side of the aerosol-generating device such that an aerosol-generating article may be inserted into the chamber in direction which is perpendicular to the longitudinal axis of the aerosol-generating device.

As used herein, the term "proximal" refers to a user end, or mouth end of the aerosol-generating device, and the term "distal" refers to the end opposite to the proximal end. When referring to the chamber or the inductor coil, the term "proximal" refers to the region closest to the open end of the chamber and the term "distal" refers to the region closest to the closed end. The ends of the aerosol-generating device or the chamber may also be referred to in relation to the direction in which air flows through the aerosol-generating device. The proximal end may be referred to as the "downstream" end and the distal end referred to as the "upstream" end.

As used herein, the term "length" refers to the major dimension in a longitudinal direction of the aerosol-generating device, of an aerosol-generating article, or of a component of the aerosol-generating device, or of an aerosol-generating article.

As used herein, the term "width" refers to the major dimension in a transverse direction of the aerosol-generating device, of an aerosol-generating article, or of a component of the aerosol-generating device, or of an aerosol-generating article, at a particular location along its length. The term "thickness" refers to the dimension in a transverse direction perpendicular to the width.

As used herein, the term 'aerosol-forming substrate' relates to a substrate capable of releasing volatile compounds that can form an aerosol. Such volatile compounds may be released by heating the aerosol-forming substrate. An aerosol-forming substrate is part of an aerosol-generating article.

As used herein, the term 'aerosol-generating article' refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco is referred to as a tobacco stick. As used herein, the term "aerosol-generating device" refers to a device that interacts with an aerosol-generating article to generate an aerosol.

As used herein, the term "aerosol-generating system" refers to the combination of an aerosol-generating article, as further described and illustrated herein, with an aerosol-generating device, as further described and illustrated herein. In the system, the aerosol-generating article and the aerosol-generating device cooperate to generate a respirable aerosol.

As used herein, the term 'elongate' refers to a component having a length which is greater than both its width and thickness, for example twice as great.

As used herein, a "susceptor element" means a conductive element that heats up when subjected to a changing magnetic field. This may be the result of eddy currents induced in the susceptor element, hysteresis losses, or both eddy currents and hysteresis losses. During use, the susceptor elements are located in thermal contact or close thermal proximity with the aerosol-forming substrate of an aerosol-generating article received in the chamber of the aerosol-generating device. In this manner, the aerosol-forming substrate is heated by the susceptor elements such that an aerosol is formed.

Advantageously, providing a plurality of elongate susceptor elements spaced apart from each other may facilitate even heating of the aerosol-forming substrate across the width of the aerosol-generating article. Even heat distribution may result in more consistent aerosol properties and more effective use of the aerosol-forming substrate. The use of different susceptors having differences such as different dimensions, or shapes, or materials, may allow for sequential heating of different portions of the aerosol-forming substrate, which may also promote more effective use of the aerosol-forming substrate. By heating the aerosol-forming substrate more effectively, the power required to heat the aerosol-forming substrate may be reduced relative to existing systems. This may increase the efficiency of devices according to the invention. This may allow battery size to be reduced or may allow battery life to be increased for a given battery size. This may facilitate a more compact arrangement.

The plurality of elongate susceptor elements may be spaced apart from each other in a transverse direction of the chamber. The plurality of elongate susceptor elements may be spaced apart from each other along a plane that is orthogonal to the longitudinal axis of the chamber.

By providing more even heating across the width of the aerosol-generating article, the width or thickness, or width and thickness, of each individual susceptor element may be reduced. This may advantageously reduce the force required to insert an aerosol-generating article into the chamber. Reducing the width or thickness, or width and thickness, of each individual susceptor element may reduce the amount of aerosol-forming substrate which is displaced during insertion, thereby reducing or eliminating the need to cleaning the chamber after use.

Additionally, in embodiments in which the chamber of the aerosol-generating device and the aerosol-generating article have circular cross-sections, the claimed arrangement of elongate susceptor elements may reduce or prevent inadvertent rotation of the aerosol-generating article within the chamber which may otherwise result in damage to the heater.

Using inductive heating has the advantage that the heating element, in this case the susceptor elements, need not be electrically joined to any other components, eliminating the need for solder or other bonding elements for the heating element. Furthermore, the inductor coil is provided as part of the aerosol-generating device, making it possible to construct an aerosol-generating article that is simple, inexpensive and robust. Aerosol-generating articles are typically disposable and produced in much larger numbers that the aerosol-generating devices with which they operate. Accordingly, reducing the cost of the aerosol-generating articles, even if it requires a more expensive device, can lead to significant cost savings for both manufacturers and consumers.

In addition, the use of inductive heating rather than a resistive coil may provide improved energy conversion because of power losses associated with a resistive coil, in particular losses due to contact resistance at connections between the resistive coil and the power supply.

Advantageously, using an inductor coil rather than a resistive coil may extend the lifetime of the aerosol-generating device since the inductor coil itself undergoes minimal heating during use of the aerosol-generating device.

The plurality of elongate susceptor elements may be arranged such that their respective longitudinal axes are at an angle to each other. That is, the plurality of elongate susceptor elements may be non-parallel. In preferred embodiments, the plurality of elongate susceptor elements are substantially parallel with each other.

As used, herein, the term "substantially parallel" means within plus or minus 10 degrees, preferably within plus or minus 5 degrees.

The plurality of elongate susceptor elements extend in the longitudinal direction of the chamber. That is, preferably, at least a portion of each susceptor element extends substantially parallel with the longitudinal axis of the chamber. Advantageously, this facilitates insertion of at least a portion of the elongate susceptor elements into an aerosol-generating article when the aerosol-generating article is inserted into the chamber. The plurality of elongate susceptor elements may be arranged such that their longitudinal axes are at an angle to, that is, non-parallel with, the longitudinal axis of the chamber. One or more of the plurality of elongate susceptor elements may be substantially parallel with the longitudinal axis of the chamber.

In preferred embodiments, the plurality of elongate susceptor elements are substantially parallel with the longitudinal axis of the chamber. In this manner, the susceptor elements may be more easily inserted into the aerosol-generating article when the aerosol-generating article is inserted into the chamber.

The magnetic axis of the induction element, for example the inductor coil, may be at an angle to, that is, non-parallel with, the longitudinal axis of the chamber. In preferred embodiments, the magnetic axis of the inductor coil is substantially parallel with the longitudinal axis of the chamber. This may facilitate a more compact arrangement. Preferably, at least a portion of each elongate susceptor element is substantially parallel with the magnetic axis of the inductor coil. This may facilitate even heating of the elongate susceptor elements by the inductor coil. In particularly preferred embodiments, the plurality of elongate susceptor elements are substantially parallel with each other, with the magnetic axis of the inductor coil, and with the longitudinal axis of the chamber.

One or more of the plurality of elongate susceptor elements may be at least partially coincident with the longitudinal axis of the chamber. For example, one or more of the plurality of elongate susceptor elements may be at an angle to the longitudinal axis of the chamber and may pass through the longitudinal axis of the chamber at a position along its length. Alternatively, or in addition, one of the plurality of elongate susceptor elements may be parallel with the longitudinal axis of the chamber and positioned centrally within the chamber such that it extends along the longitudinal axis of the chamber.

In preferred embodiments, the plurality of elongate susceptor elements are each spaced apart from the longitudinal axis of the chamber. In this manner, the plurality of elongate susceptor elements are spaced apart from each other and from the longitudinal axis of the chamber. This may facilitate even heat distribution across the chamber and, consequently, across the width of an aerosol-generating article received in the chamber.

Where the plurality of elongate susceptor elements are spaced apart from the longitudinal axis of the chamber, the distance of one or more of the plurality of elongate susceptor elements from the longitudinal axis may differ from that of one or more of the other elongate susceptor elements. This may allow the aerosol-generating device to more evenly heat a non-symmetrical aerosol-forming substrate.

In preferred embodiments, the plurality of elongate susceptor elements are equidistant from the longitudinal axis of the chamber. That is, the distance of each of the plurality of elongate susceptor elements from the longitudinal axis is the same at a given position along the length of the susceptor elements. This may facilitate even heating of a symmetrical aerosol-forming substrate by distributing heat evenly across the width of the chamber. It may also avoid the need for an aerosol-generating article to be inserted into the chamber with a particular orientation, as may be the case with a non-symmetrical aerosol-forming substrate and differing distances of the plurality of elongate susceptor elements from the longitudinal axis.

The plurality of elongate susceptor elements may comprise any suitable number of susceptor elements projecting into the chamber. The number of susceptor elements may be selected, for example, based on the size of the chamber, the size, geometry and composition of the susceptor elements, and the size and composition of the aerosol-forming substrate with which the aerosol-generating device is intended for use. For example, the plurality of elongate susceptor elements may consist of two elongate susceptor elements which are spaced apart in a transverse direction of the chamber.

In certain embodiments, the plurality of elongate susceptor elements comprises three or more elongate susceptor elements. For example, the plurality of elongate susceptor elements may comprise three, four, five, six, seven, eight, nine, ten or more elongate susceptor elements. In such embodiments, the plurality of elongate susceptor elements may be spaced apart from each other in a single transverse direction such that they extend substantially along the same plane. This may allow for more even heating of an aerosol-forming substrate in comparison to an arrangement consisting of two elongate susceptor elements. Alternatively, the plurality of elongate susceptor elements may be spaced apart in a first transverse direction of the chamber and in a second traverse direction of the chamber which is perpendicular the first transverse direction. In this manner, the plurality of elongate susceptor elements are spaced apart across an area. This may result in particularly even heating of the aerosol-forming substrate of an aerosol-generating article received in the chamber.

Where the plurality of elongate susceptor elements comprises three or more elongate susceptor elements, the three or more elongate susceptor elements may be spaced apart from each other in an irregular pattern with uneven spacing between one or more pairs of adjacent susceptor elements. The plurality of elongate susceptor elements may be arranged in a formation in which each susceptor element is positioned at the vertex of a polygon having sides of unequal length, having unequal corner angles, or having sides of unequal length and unequal corner angles. For example, the plurality of elongate susceptor elements may consist of four elongate susceptor elements positioned at the vertices of a rectangle, a trapezium, a diamond, a kite shape, positioned on a single circle, or in another other irregular formation.

In preferred embodiments, the plurality of elongate susceptor elements may be arranged in a regular pattern. As used herein, the term "regular pattern" is used to denote a pattern comprising a consistently spaced array of elongate susceptor elements. For example, the elongate susceptor elements may be provided in a regular striped pattern, a regular checked or square pattern, a regular brick pattern, a regular honeycomb or hexagonal pattern, or any other regular geometric pattern. The arrangement of the plurality of elongate susceptor elements may be chosen based on the cross-sectional shape of the inductor coil, or vice versa.

The inductor coil may have a circular cross-sectional shape. The inductor coil may have a non-circular cross-sectional shape. For example, the inductor coil may have an elliptical, triangular, square, rectangular, trapezoidal, rhomboidal, diamond, kite, pentagonal, hexagonal, heptagonal, octagonal, nonagonal, decagonal, or any other polygonal cross-sectional shape. The inductor coil may have a regular polygonal cross-sectional shape. For example, an equilateral triangular, square, regular pentagonal, regular hexagonal, regular heptagonal, regular octagonal, regular nonagonal, or regular decagonal cross-sectional shape.

The plurality of elongate susceptor elements may be arranged in a formation in which each susceptor element is positioned at the vertex of a regular polygon. That is, at the vertex of a polygon that is equiangular and equilateral. This may allow for more consistent heating across the area of the chamber. For example, where the plurality of elongate susceptor elements comprises three elongate susceptor elements, these may be arranged in a triangular formation, such as an equilateral triangular formation. Where the plurality of elongate susceptor elements comprises four elongate susceptor elements, these may be arranged in a square formation.

The plurality of elongate susceptor elements project into the chamber. Preferably each elongate susceptor element has a free end projecting into the chamber. Preferably, the free end is configured for insertion into an aerosol-generating article when the aerosol-generating article is inserted in the chamber. Preferably, the free end of one or more of the plurality of elongate susceptor elements is tapered. This means that the cross-sectional area of a portion of the elongate susceptor element decreases in a direction towards the free end. Advantageously, a tapered free end facilitates insertion of the elongate susceptor element into an aerosol-generating article. Advantageously, a tapered free end may reduce the amount of aerosol-forming substrate displaced by the elongate susceptor element during insertion of an aerosol-generating article into the chamber. This may reduce the amount of cleaning required. In preferred embodiments, each of the plurality of elongate susceptor elements is tapered at its free end. Preferably, each of the plurality of elongate susceptor elements tapers towards a sharp tip at its free end.

The aerosol-generating device comprises a plurality of elongate susceptor elements projecting into the chamber. The aerosol-generating device may further comprise non-elongate susceptor elements within the chamber. The aerosol-generating device may further comprise one or more external susceptor elements. External susceptor elements are configured to remain outside of an aerosol-generating article received in the chamber. For example, the one or more external susceptor elements may extend at least partially around the circumference of the aerosol-generating article when received in the chamber.

The elongate susceptor elements may be formed from any material that can be inductively heated to a temperature sufficient to aerosolise an aerosol-forming substrate. Suitable materials for the elongate susceptor elements include graphite, molybdenum, silicon carbide, stainless steels, niobium, aluminium, nickel, nickel containing compounds, titanium, and composites of metallic materials. Preferred elongate susceptor elements comprise a metal or carbon. Advantageously each elongate susceptor element comprises or consists of a ferromagnetic material, for example, ferritic iron, a ferromagnetic alloy, such as ferromagnetic steel or stainless steel, ferromagnetic particles, and ferrite. A suitable elongate susceptor element may be, or comprise, aluminium. The elongate susceptor element preferably comprises more than 5 percent, preferably more than 20 percent, more preferably more than 50 percent or more than 90 percent of ferromagnetic or paramagnetic materials. Preferred elongate susceptor elements may be heated to a temperature in excess of 250 degrees Celsius.

One or more of the susceptor elements may be formed from a single material layer. The single material layer may be a steel layer.

The elongate susceptor elements may comprise a non-metallic core with a metal layer disposed on the non-metallic core. For example, one or more of the elongate susceptor elements may comprise metallic tracks formed on an outer surface of a ceramic core or substrate.

One or more of the susceptor elements may be formed from a layer of austenitic steel. One or more layers of stainless steel may be arranged on the layer of austenitic steel. For example, one or more of the susceptor elements may be formed from a layer of austenitic steel having a layer of stainless steel on each of its upper and lower surfaces.

The elongate susceptor elements may each comprise a first susceptor material and a second susceptor material. The first susceptor material may be disposed in intimate physical contact with the second susceptor material. The first and second susceptor materials may be in intimate contact to form a unitary susceptor. In certain embodiments, the first susceptor material is stainless steel and the second susceptor material is nickel. One or more of the susceptor elements may have a two layer construction. Such susceptor elements may be formed from a stainless steel layer and a nickel layer.

Intimate contact between the first susceptor material and the second susceptor material may be made by any suitable means. For example, the second susceptor material may be plated, deposited, coated, clad or welded onto the first susceptor material. Preferred methods include electroplating, galvanic plating and cladding.

The second susceptor material may have a Curie temperature that is lower than 500° C. The first susceptor material may be primarily used to heat the susceptor when the susceptor is placed in an alternating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys. The Curie temperature of the second susceptor material may preferably be selected to be lower than 400° C., preferably lower than 380° C., or lower than 360° C. It is preferable that the second susceptor material is a magnetic material selected to have a Curie temperature that is substantially the same as a desired maximum heating temperature. That is, it is preferable that the Curie temperature of the second susceptor material is approximately the same as the temperature that the susceptor should be heated to in order to generate an aerosol from the aerosol-forming substrate. The Curie temperature of the second susceptor material may, for example, be within the range of 200° C. to 400° C., or between 250° C. and 360° C. In some embodiments it may be preferred that the first susceptor material is in the form of an elongate strip having a width of between 3 mm and 6 mm and a thickness of between 10 micrometres and 200 micrometres, and that the second susceptor material is in the form of discrete patches that are plated, deposited, or welded onto the first susceptor material. For example, the first susceptor material may be an elongate strip of grade 430 stainless steel or an elongate strip of aluminium and the second elongate material may be in the form of patches of nickel having a thickness of between 5 micrometres and 30 micrometres deposited at intervals along the elongate strip of the first susceptor material. Patches of the second susceptor material may have a width of between 0.5 mm and the thickness of the elongate strip. For example, the width may be between 1 mm and 4 mm, or between 2 mm and 3 mm. Patches of the second susceptor material may have a length between 0.5 mm and about 10 mm, preferably between 1 mm and 4 mm, or between 2 mm and 3 mm.

In some embodiments it may be preferred that the first susceptor material and the second susceptor material are co-laminated in the form of an elongate strip having a width of between 3 mm and 6 mm and a thickness of between 10 micrometres and 200 micrometres. Preferably, the first susceptor material has a greater thickness than the second susceptor material. The co-lamination may be formed by any suitable means. For example, a strip of the first susceptor material may be welded or diffusion bonded to a strip of the second susceptor material. Alternatively, a layer of the second susceptor material may be deposited or plated onto a strip of the first susceptor material.

In some embodiments it may be preferred that each elongate susceptor has a width of between 3 mm and 6 mm and a thickness of between 10 micrometres and 200 micrometres, the susceptor comprising a core of the first susceptor material encapsulated by the second susceptor material. Thus, the susceptors may each comprise a strip of the first susceptor material that has been coated or clad by the second susceptor material. As an example, the susceptor may comprise a strip of 430 grade stainless steel having a length of 12 mm, a width of 4 mm and a thickness of between 10 micrometres and 50 micrometres, for example 25 micrometres. The grade 430 stainless steel may be coated with a layer of nickel of between 5 micrometres and 15 micrometres, for example 10 micrometres.

One or more of the elongate susceptor elements may comprise a first susceptor material, a second susceptor material and a protective layer. The first susceptor material may be disposed in intimate physical contact with the second susceptor material. The protective layer may be disposed in intimate physical contact with one or both of the first susceptor material the second susceptor material. The first and second susceptor materials and the protective layer may be in intimate contact to form a unitary susceptor. The protective layer may be a layer of austenitic steel. In certain embodiments, one or more of the elongate susceptor elements comprises a layer of steel, a layer of nickel, and a protective layer of austenitic steel. The protective layer of austenitic steel may be applied to the nickel layer. This may help to protect the nickel layer from detrimental environmental effects, such as oxidation, corrosion, and diffusion.

The plurality of elongate susceptor elements may be formed from the same materials. Alternatively, one or more of the elongate susceptor elements may comprise susceptor material or materials having different susceptor characteristics to at least one of the other susceptor elements. This may facilitate fine-tuning of heat distribution. This may also facilitate sequential heating of the susceptor elements. For example, by forming the susceptor elements from materials for which optimal heating occurs at different frequencies of alternating current.

The elongate susceptor elements may have any suitable cross-section. For example, the elongate susceptor elements may have a square, oval, rectangular, triangular, pentagonal, hexagonal, or similar cross-sectional shape. The elongate susceptor elements may have a planar or flat cross-sectional area.

The elongate susceptor elements may be solid, hollow, or porous. Preferably, each elongate susceptor element is solid. Each susceptor element is preferably in the form of a pin, rod, blade, or plate. Each susceptor element preferably has a length of between 5 millimetres and 15 millimetres, for example between 6 millimetres and 12 millimetres, or between 8 millimetres and 10 millimetres. Each susceptor element preferably has a width of between 1 millimetre and 8 millimetres, more preferably from about 3 millimetres to about 5 millimetres. Each susceptor element may have a thickness of from about 0.01 millimetre to about 2 millimetres. If a susceptor element has a constant cross-section, for example a circular cross-section, it has a preferable width or diameter of between 1 millimetre and 5 millimetres.

The plurality of elongate susceptor elements may have substantially the same length. That is, the length of each elongate susceptor element may be within 10 percent, preferably 5 percent, of the lengths of the other elongate susceptor elements. The length of one or more of the plurality of elongate susceptor elements may differ from the lengths of the other elongate susceptor elements. The plurality of elongate susceptor elements may all have different lengths.

The plurality of elongate susceptor elements may have substantially the same width. That is, the width of each elongate susceptor element may be within 10 percent, preferably 5 percent, of the width of the other elongate susceptor elements. The width of one or more of the plurality of elongate susceptor elements may differ from the widths of the other elongate susceptor elements. The plurality of elongate susceptor elements may all have different widths.

The plurality of elongate susceptor elements may have substantially the same thickness. That is, the thickness of each elongate susceptor element may be within 10 percent, preferably 5 percent, of the thickness of the other elongate susceptor elements. The thickness of one or more of the plurality of elongate susceptor elements may differ from the thicknesses of the other elongate susceptor elements. The plurality of elongate susceptor elements may all have different thicknesses.

The elongate susceptor elements may each have a protective external layer, for example a protective ceramic layer or protective glass layer. The protective external layer may encapsulate the elongate susceptor element. The elongate susceptor elements may each comprise a protective coating formed by a glass, a ceramic, or an inert metal, formed over a core of susceptor material.

Preferably, the aerosol-generating device is portable. The aerosol-generating device may have a size comparable to a conventional cigar or cigarette. The aerosol-generating device may have a total length between approximately 30 millimetres and approximately 150 millimetres. The aerosol-generating device may have an external diameter between approximately 5 millimetres and approximately 30 millimetres.

The aerosol-generating device housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user.

Alternatively, the mouthpiece may be provided as part of an aerosol-generating article.

As used herein, the term "mouthpiece" refers to a portion of an aerosol-generating device that is placed into a user's mouth in order to directly inhale an aerosol generated by the aerosol-generating device from an aerosol-generating article received in the chamber of the housing.

The aerosol-generating device may include a user interface to activate the aerosol-generating device, for example a button to initiate heating of the aerosol-generating device or display to indicate a state of the aerosol-generating device or of the aerosol-forming substrate.

The aerosol-generating device comprises a power supply. The power supply may be a battery, such as a rechargeable lithium ion battery. Alternatively, the power supply may be another form of charge storage device such as a capacitor. The power supply may require recharging. The power supply may have a capacity that allows for the storage of enough energy for one or more uses of the aerosol-generating device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations.

The power supply may be a DC power supply. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The power supply may be configured to operate at high frequency. As used herein, the term "high frequency oscillating current" means an oscillating current having a frequency of between 500 kilohertz and 30 megahertz. The high frequency oscillating current may have a frequency of from about 1 megahertz to about 30 megahertz, preferably from about 1 megahertz to about 10 megahertz and more preferably from about 5 megahertz to about 8 megahertz.

The aerosol-generating device comprises a controller connected to the inductor coil and the power supply. The controller is configured to control the supply of power to the inductor from the power supply. The controller may comprise a microprocessor, which may be a programmable microprocessor, a microcontroller, or an application specific integrated chip (ASIC) or other electronic circuitry capable of providing control. The controller may comprise further electronic components. The controller may be configured to regulate a supply of current to the inductor coil. Current may be supplied to the inductor coil continuously following activation of the aerosol-generating device or may be supplied intermittently, such as on a puff by puff basis. The electric circuitry may advantageously comprise DC/AC inverter, which may comprise a Class-D or Class-E power amplifier.

One or more of the plurality of elongate susceptor elements may be fixedly attached to the housing of the aerosol-generating device. In such embodiments, the fixedly attached elongate susceptor elements may not be readily removed from the aerosol-generating device housing, for example without damaging the susceptor element or the housing.

Advantageously, one or more of the plurality of elongate susceptor elements may be removably attached to the housing. For example, one or more of the plurality of elongate susceptor elements may be removably attached to the housing within the chamber. The part of the aerosol-generating device that is heated and may therefore exhibit a shorter lifetime is the susceptor elements. Thus, providing a removable elongate susceptor element allows the elongate susceptor element to be replaced easily and may extend the lifetime of the aerosol-generating device. Advantageously, providing a removable elongate susceptor element also facilitates cleaning of the susceptor element, replacement of the susceptor element, or both. It may also facilitate cleaning of the chamber. It may allow the susceptor element to be selectively replaced by a user according to the aerosol-generating article with which the susceptor element will be used. For example, certain susceptor elements may be particularly suited, or tuned, for use with a particular type of aerosol-generating article, or with an aerosol-generating article having a particular arrangement or type of aerosol-forming substrate. This may allow the performance of the aerosol-generating device with which the susceptor element is used to be optimised based on the type of aerosol-generating article.

The plurality of elongate susceptor elements may be removably attached to the housing. In such embodiments, the plurality of elongate susceptor elements may be removably attached to the housing by any suitable mechanism. For example, by a threaded connection, by frictional engagement, or by a mechanical connection such as a bayonet, a clip, or equivalent mechanism. The plurality of elongate susceptor elements may be removable from the aerosol-generating device individually or together with one or more of the other elongate susceptor elements.

The plurality of elongate susceptor elements may be attached to the housing directly or via one or more intermediate components. The plurality of elongate susceptor elements may be attached to a base portion configured for removable attachment to the aerosol-generating device. The elongate susceptor elements may extend orthogonally from the base portion. This may facilitate insertion of the elongate susceptor elements into the aerosol-generating device.

The base portion may be configured to detachably connect to the aerosol-generating device housing by at least one of an interference fit, a bayonet connector, and a screw connector. The base portion may be configured for removable attachment to the housing by a magnetic attachment. Advantageously, a magnetic attachment provides a simple and effective mechanism for removably attaching the elongate susceptor elements to the aerosol-generating device.

The base portion may comprise a permanent magnet and the aerosol-generating device may comprise a ferromagnetic material at an upstream end of the chamber. The base portion may comprise a ferromagnetic material and the aerosol-generating device may comprise a permanent magnet at an upstream end of the chamber. Advantageously, providing only one of the base portion and the aerosol-generating device with a permanent magnet may simplify and reduce the cost of manufacture of the aerosol-generating device.

The base portion may comprise a permanent magnet and the aerosol-generating device may comprise a permanent magnet at an upstream end of the chamber. Advantageously, providing both the base portion and the aerosol-generating device with a permanent magnet may increase the strength of the magnetic attachment when compared to embodiments comprising only a single permanent magnet. Advantageously, the permanent magnet in the base portion and the permanent magnet in the aerosol-generating device may each be oriented to that the attraction between the two permanent magnets results in a desired orientation of the elongate susceptor element when the elongate susceptor element is inserted into the chamber.

In embodiments in which the base portion is configured for removable attachment to the housing by a magnetic attachment, the aerosol-generating device may be combined with an extraction tool for removing the elongate susceptor elements from the chamber. Preferably, the extraction tool is sized for insertion into the chamber and comprises a permanent magnet at an end of the extraction tool. The permanent magnet at the end of the extraction tool provides a stronger attractive force between the extraction tool and the base portion than the attractive force between the base portion and the aerosol-generating device. Preferably, the extraction tool comprises a cavity or cavities for receiving one or more of the elongate susceptor elements when the extraction tool is inserted into the chamber.

Preferably, the housing comprises an opening at an end of the chamber for insertion of an aerosol-generating article into the chamber. Preferably, the base portion is sized and shaped for insertion of the elongate susceptor elements and the base portion into the chamber through the opening. Advantageously, this may eliminate the need for a separate aperture to facilitate insertion of the elongate susceptor elements into the chamber.

Preferably, a cross-sectional shape of the base portion is substantially the same as a cross-sectional shape of the chamber. The base portion may have a substantially circular cross-sectional shape.

The plurality of elongate susceptor elements may be detachable from the base portion. Advantageously, this may facilitate re-use of the base portion with multiple elongate susceptor elements. This may be desirable, since the build-up of deposits may occur more quickly on the elongate susceptor elements than the base portion.

According to a second aspect of the present invention, there is provided a removable susceptor assembly for an aerosol-generating device according to the first aspect of the present invention in accordance with any of the embodiments discussed herein, wherein the removable susceptor assembly comprises a base portion configured to removably attach to the housing. The plurality of elongate susceptor elements are attached to the base portion such that the plurality of elongate susceptor elements project into the chamber when the base portion is removably coupled to the housing. This may facilitate insertion of the elongate susceptor elements into the aerosol-generating device. The base portion may be configured to detachably connect to the aerosol-generating device housing by at least one of an interference fit, a bayonet connector, and a screw connector. The base portion may be configured for removable attachment to the housing by a magnetic attachment. Advantageously, a magnetic attachment provides a simple and effective mechanism for removably attaching the elongate susceptor elements to the aerosol-generating device. The base portion may comprise a permanent magnet for removably attachment of the base portion to the housing of an aerosol-generating device.

The plurality of elongate susceptor elements may be detachable from the base portion. Advantageously, this may facilitate re-use of the base portion with multiple elongate susceptor elements. This may be desirable, since the build-up of deposits may occur more quickly on the elongate susceptor elements than the base portion.

According to a further aspect of the present invention, there is provided an aerosol-generating system comprising an aerosol-generating device according to the alternate aspect of the present invention and an aerosol-generating article having an aerosol-forming substrate and configured for use with the aerosol-generating device.

According to a yet further aspect of the present invention, there is provided an aerosol-generating system comprising an aerosol-generating device and an aerosol-generating article having an aerosol-forming substrate and configured for use with the aerosol-generating device. The aerosol-generating device comprises: a housing having a chamber sized to receive at least a portion of the aerosol-generating article; an inductor coil disposed around at least a portion of the chamber; and a power supply and a controller connected to the inductor coil, wherein the aerosol-generating system further comprises a plurality of elongate susceptor elements positioned such that, when the aerosol-generating article is received in the chamber, the plurality of elongate susceptor elements extend in a longitudinal direction of the chamber and are spaced apart from each other, and wherein the power supply and the controller are configured to provide an alternating electric current to the inductor coil such that, in use, the inductor coil generates an alternating magnetic field to heat the plurality of elongate susceptor elements and thereby heat at least a portion of the aerosol-generating article.

The plurality of elongate susceptor elements may be positioned such that, when the aerosol-generating article is received in the chamber, the plurality of elongate susceptor elements are spaced apart from each other in a transverse direction of the chamber.

The plurality of elongate susceptor elements may be provided as part of the aerosol-generating device. In such embodiments, the aerosol-generating device may be substantially as described herein in relation to the first aspect of the invention.

The plurality of elongate susceptor elements may be provided as part of the aerosol-generating article. The plurality of elongate susceptor elements may be in thermal proximity to the aerosol forming substrate. The plurality of elongate susceptor elements may be embedded in the aerosol-forming substrate. Form, kind, distribution and arrangement of the plurality of elongate susceptor elements may be selected according to a user's need. The plurality of elongate susceptor elements may be arranged substantially longitudinally within the aerosol-generating article. This means that the length dimension of each elongate susceptor element may be arranged to be approximately parallel to the longitudinal direction of aerosol-generating article, for example within plus or minus 10 degrees of parallel to the longitudinal direction of the aerosol-generating article.

Advantageously, by providing more even heating of the aerosol-forming substrate, the size of the individual susceptor elements may be reduced. When these are provided as part of the aerosol-generating article, the volume occupied by the smaller susceptor elements is reduced. This may allow the amount of aerosol-forming substrate in an aerosol-generating article of a given size to be increased. This may allow the aerosol properties of the aerosol-generating article to be improved. It may allow the size of the aerosol-generating article to be reduced for a given amount of aerosol-forming substrate.

Where the plurality of elongate susceptor elements are provided as part of the aerosol-generating article, the elongate susceptor elements are preferably in the form of a pin, rod, blade, or plate. Each elongate susceptor element preferably has a length of between 5 millimetres and 15 millimetres, for example between 6 millimetres and 12 millimetres, or between 8 millimetres and 10 millimetres. Each susceptor element preferably has a width of between 1 millimetre and 8, for preferably from about 3 millimetres to about 5 millimetres. Each elongate susceptor element may have a thickness of between 0.01 millimetre and 2 millimetres, for example between 0.5 millimetre and 2 millimetres. If an elongate susceptor element has a constant cross-section, for example a circular cross-section, it has a preferable width or diameter of between 1 millimetre and 5 millimetres.

The elongate susceptor elements may be formed from any material that can be inductively heated to a temperature sufficient to generate an aerosol from the aerosol-forming substrate. Preferred susceptor elements comprise a metal or carbon. A suitable susceptor element may comprise a ferromagnetic material, for example ferritic iron, or a ferromagnetic steel or stainless steel. A suitable susceptor element may be, or comprise, aluminium. Preferred susceptor elements may be formed from 400 series stainless steels, for example grade 410, or grade 420, or grade 430 stainless steel. Different materials will dissipate different amounts of energy when positioned within magnetic fields having similar values of frequency and field strength. Thus, parameters of the elongate susceptor elements such as material type, length, width, and thickness may all be altered during manufacture to provide a desired power dissipation within a known magnetic field.

The plurality of susceptor elements may be provided as part of both the aerosol-generating device and the aerosol-generating article. For example, the plurality of elongate susceptor elements may comprise a plurality of elongate susceptor elements forming part of the aerosol-generating device and one or more elongate susceptor elements forming part of the aerosol-generating article.

The system of any aerosol-generating system described above may be an electrically operated smoking system. The system may be a handheld aerosol-generating system. The aerosol-generating system may have a size comparable to a conventional cigar or cigarette. The smoking system may have a total length between approximately 30 mm and approximately 150 mm. The smoking system may have an external diameter between approximately 5 mm and approximately 30 mm.

The aerosol-generating system may be a combination of an aerosol-generating device and one or more aerosol-generating articles for use with the aerosol-generating device. However, an aerosol-generating system may include additional components, such as, for example a charging unit for recharging an on-board electric power supply in an electrically operated or electric aerosol-generating device.

The aerosol-forming substrate of any aspect described herein may comprise nicotine. The nicotine-containing aerosol-forming substrate may be a nicotine salt matrix. The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. Alternatively, the aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, and preferably from about 5 percent to about 30 percent by weight on a dry weight basis. The aerosol-forming substrate may comprise other additives and ingredients, such as flavourants.

In any of the above embodiments, the aerosol-generating article and the chamber of the aerosol-generating device may be arranged such that the aerosol-generating article is partially received within the chamber of the aerosol-generating device. The chamber of the aerosol-generating device and the aerosol-generating article may be arranged such that the aerosol-generating article is entirely received within the chamber of the aerosol-generating device.

The aerosol-generating article may be substantially cylindrical in shape. The aerosol-generating article may be substantially elongate. The aerosol-generating article may have a length and a circumference substantially perpendicular to the length. The aerosol-forming substrate may be provided as an aerosol-forming segment containing an aerosol-forming substrate. The aerosol-forming segment may be substantially cylindrical in shape. The aerosol-forming segment may be substantially elongate. The aerosol-forming segment may also have a length and a circumference substantially perpendicular to the length.

The aerosol-generating article may have a total length between approximately 30 millimetres and approximately 100 millimetres. In one embodiment, the aerosol-generating article has a total length of approximately 45 millimetres. The aerosol-generating article may have an external diameter between approximately 5 millimetres and approximately 12 millimetres. In one embodiment, the aerosol-generating article may have an external diameter of approximately 7.2 millimetres.

The aerosol-forming substrate may be provided as an aerosol-forming segment having a length of between about 7 millimetres and about 15 millimetres. In one embodiment, the aerosol-forming segment may have a length of approximately 10 mm. Alternatively, the aerosol-forming segment may have a length of approximately 12 millimetres.

The aerosol-generating segment preferably has an external diameter that is approximately equal to the external diameter of the aerosol-generating article. The external diameter of the aerosol-forming segment may be between approximately 5 millimetres and approximately 12 millimetres. In one embodiment, the aerosol-forming segment may have an external diameter of approximately 7.2 millimetres.

The aerosol-generating article may comprise a filter plug. The filter plug may be located at a downstream end of the aerosol-generating article. The filter plug may be a cellulose acetate filter plug. The filter plug is approximately 7 millimetres in length in one embodiment, but may have a length of between approximately 5 millimetres to approximately 10 millimetres.

The aerosol-generating article may comprise an outer paper wrapper. Further, the aerosol-generating article may comprise a separation between the aerosol-forming substrate and the filter plug. The separation may be approximately 18 millimetres, but may be in the range of approximately 5 millimetres to approximately 25 millimetres.

Features described in relation to one or more aspects may equally be applied to other aspects of the invention.

An aerosol generating system as described herein may comprise any of the following features:

An aerosol-generating device may comprise a housing having a chamber sized to receive at least a portion of an aerosol-generating article; an inductor coil disposed around at least a portion of the chamber; a plurality of elongate susceptor elements projecting into the chamber, the plurality of elongate susceptor elements extending in a longitudinal direction of the chamber and being spaced apart from each other; and a power supply and a controller connected to the inductor coil and configured to provide an alternating electric current to the inductor coil such that, in use, the inductor coil generates an alternating magnetic field to heat the plurality of elongate susceptor elements and thereby heat at least a portion of an aerosol-generating article received in the chamber.

An aerosol-generating device may comprise a plurality of elongate susceptor elements which are substantially parallel with each other.

An aerosol-generating device may comprise a plurality of elongate susceptor elements which are substantially parallel with the longitudinal axis of the chamber.

An aerosol-generating device may comprise a plurality of elongate susceptor elements which are each spaced apart from the longitudinal axis of the chamber.

An aerosol-generating device may comprise a plurality of elongate susceptor elements which are equidistant from the longitudinal axis of the chamber.

An aerosol-generating device may comprise a plurality of elongate susceptor elements comprising three or more elongate susceptor elements which are spaced apart in a first transverse direction of the chamber and in a second traverse direction of the chamber which is perpendicular the first transverse direction.

An aerosol-generating device may comprise three or more elongate susceptor elements arranged in a regular pattern.

An aerosol-generating device may comprise a plurality of elongate susceptor elements each of which is tapered at its free end.

An aerosol-generating device may comprise a plurality of elongate susceptor elements which are removably attached to the housing.

A removable susceptor assembly for an aerosol-generating device may comprise a plurality of elongate susceptor elements and a base portion configured to removably attach to the housing of an aerosol-generating device, wherein the plurality of elongate susceptor elements are attached to the base portion such that the plurality of elongate susceptor elements project into the chamber when the base portion is removably coupled to the housing.

An aerosol-generating system may comprise an aerosol-generating device as described anywhere herein and an aerosol-generating article having an aerosol-forming substrate which is configured for use with the aerosol-generating device.

An aerosol-generating system may comprising an aerosol-generating device and an aerosol-generating article having an aerosol-forming substrate and configured for use with the aerosol-generating device, the aerosol-generating device comprising: a housing having a chamber sized to receive at least a portion of the aerosol-generating article; an inductor coil disposed around at least a portion of the chamber; and a power supply and controller connected to the inductor coil, wherein the aerosol-generating system further comprises a plurality of elongate susceptor elements arranged such that, during use, the plurality of elongate susceptor elements extend in a longitudinal direction of the chamber and are spaced apart from each other, and wherein the power supply and the controller are configured to provide an alternating electric current to the inductor coil such that, in use, the inductor coil generates an alternating magnetic field to heat the plurality of elongate susceptor elements and thereby heat at least a portion of the aerosol-generating article.

An aerosol-generating system may comprise a plurality of elongate susceptor elements which are provided as part of the aerosol-generating device.

An aerosol-generating system may comprise a plurality of elongate susceptor elements which are provided as part of an aerosol-generating article.

Figure 2:
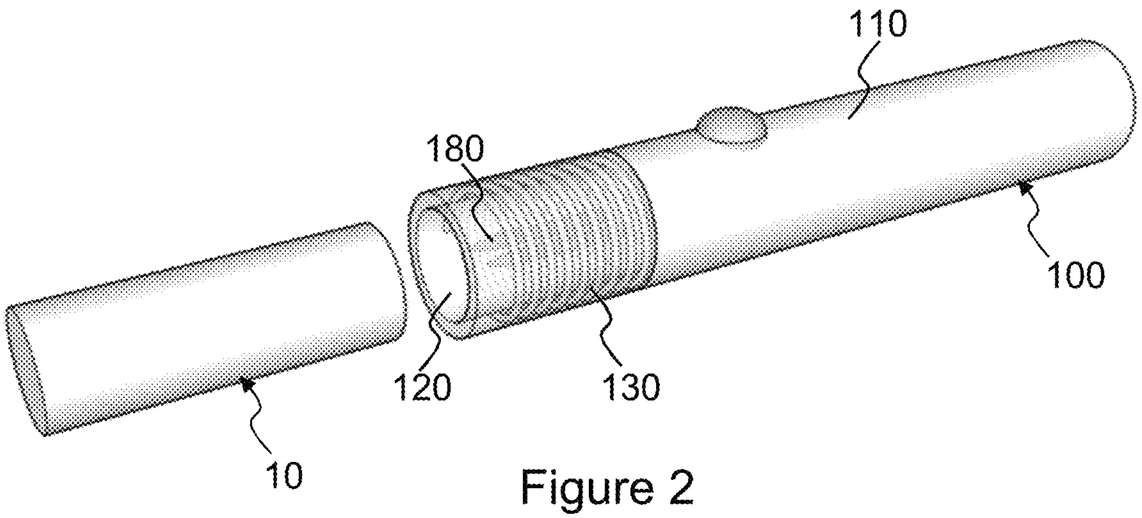
FIG. 2 is a perspective side view of the aerosol-generating system of FIG. 1, in which the inductor coil and the susceptor elements are also shown.
Figure 3:
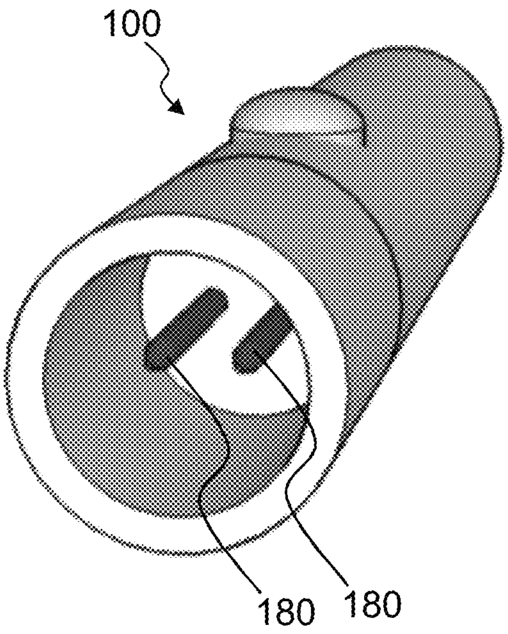
FIG. 3 is a perspective end view of the aerosol-generating system of FIG. 1.
Figure 4:
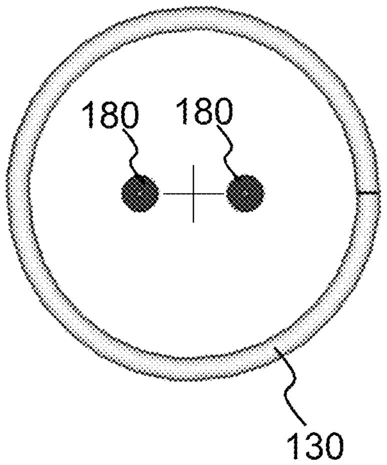
FIG. 4 is an end view of the inductor coil and susceptor elements of the aerosol-generating system of FIG. 1, with all other components omitted for clarity.

FIG. 1 shows a schematic cross-sectional illustration of an aerosol-generating system according to a first embodiment of the invention. The aerosol-generating system comprises an aerosol-generating device 100 according to a first embodiment and an aerosol-generating article 10 configured for use with the aerosol-generating device 100. FIG. 2, FIG. 3, and FIG. 4 show different views of the aerosol-generating device 100.

The aerosol-forming article 10 includes an aerosol-forming segment 20 at its distal end. The aerosol-forming segment 20 contains an aerosol-forming substrate, for example a plug comprising tobacco material and an aerosol former, which is heatable to generate an aerosol.

The aerosol generating device 100 comprises a device housing 110 defining a chamber 120 for receiving the aerosol-generating article 10. The proximal end of the housing 110 has an insertion opening 125 through which the aerosol-generating article 10 may be inserted into and removed from the chamber 120. An inductor coil 130 is arranged inside the aerosol-generating device 100 between an outer wall of the housing 110 and the chamber 120. The inductor coil 130 is a helical inductor coil having a magnetic axis corresponding to the longitudinal axis of the chamber 120, which, in this embodiment, corresponds to the longitudinal axis of the aerosol-generating device 100. As shown in FIG. 1, the inductor coil 130 is located adjacent to a distal portion of the chamber 120 and, in this embodiment, extends along part of the length of the chamber 120. In other embodiments, the inductor coil 130 may extend along all, or substantially all, of the length of the chamber 120, or may extend along part of the length of the chamber 120 and be located away from the distal portion of the chamber 120. For example, the inductor coil 130 may extend along part of the length of the chamber 120 and be adjacent to a proximal portion of the chamber 120. The inductor coil 130 is formed from a wire and has a plurality of turns, or windings, extending along its length. The wire may have any suitable cross-sectional shape, such as square, oval, or triangular. In this embodiment, the wire has a circular cross-section. In other embodiments, the wire may have a flat cross-sectional shape. For example, the inductor coil may be formed from a wire having a rectangular cross-sectional shape and wound such that the maximum width of the cross-section of the wire extends parallel to the magnetic axis of the inductor coil. Such flat inductor coils may allow the outer diameter of the inductor, and therefore the outer diameter of the aerosol-generating device, to be minimized.

The aerosol-generating device 100 also includes an internal electric power supply 140, for example a rechargeable battery, and a controller 150, for example a printed circuit board with circuitry, both located in a distal region of the housing 110. The controller 150 and the inductor coil 130 both receive power from the power supply 140 via electrical connections (not shown) extending through the housing 110. Preferably, the chamber 120 is isolated from the inductor coil 130 and the distal region of the housing 110, which contains the power source 140 and the controller 150, by a fluid-tight separation. Thus, electric components within the aerosol-generating device 100 may be kept separate from aerosol or residues produced within the chamber 120 by the aerosol generating process. This may also facilitate cleaning of the aerosol-generating device 100, since the chamber 120 may be made completely empty simply by removing the aerosol-generating article. This arrangement may also reduce the risk of damage to the aerosol-generating device, either during insertion of an aerosol-generating article or during cleaning, since no potentially fragile elements are exposed within the chamber 120. Ventilation holes (shown in FIG. 13) may be provided in the walls of the housing 110 to allow airflow into the chamber 120. Alternatively, or in addition, airflow may enter the chamber 120 at the opening 125 and flow along the length of the chamber 120 between the outer walls of the aerosol-generating article 10 and the inner walls of the chamber 120.

The aerosol-generating device 100 also includes a susceptor assembly 160 located within the chamber 120. The susceptor assembly 160 includes a base portion 170 and two elongate susceptor elements 180 attached to the base portion 170 and projecting into the chamber 120. The susceptor elements 180 are parallel with each other, with the longitudinal axis of the chamber 120, and with the magnetic axis of the inductor coil 130.

As best seen in FIG. 2, FIG. 3, and FIG. 4, the susceptor elements 180 are spaced apart in a transverse direction and evenly spaced from the longitudinal axis of the chamber 120. The susceptor elements 180 are positioned within the portion of the chamber 120 which is surrounded by the inductor coil 130 so that they are inductively heatable by the inductor coil 130. Each susceptor element 180 is tapered towards its free end to form a sharp tip. This may facilitate insertion of the susceptor element 180 into an aerosol-generating article received in the cavity. In this example, the base portion 170 is fixed within the chamber 120 and the susceptor elements 180 are fixed to the base portion 170. In other examples, the base portion 170 may be removably coupled to the housing 110 to allow the susceptor assembly 160 to be removed from the chamber 120 as a single component. For example, the base portion 170 may be removably coupled to the housing 110 using a releasable clip (not shown), a threaded connection, or similar mechanical coupling.

When the aerosol-generating device 100 is actuated, a high-frequency alternating current is passed through the inductor coil 130 to generate an alternating magnetic field within the distal portion of the chamber 120 of the aerosol-generating device 100. The magnetic field preferably fluctuates with a frequency of between 1 and 30 MHz, preferably between 2 and 10 MHz, for example between 5 and 7 MHz. When an aerosol-generating article 10 is correctly located in the chamber 120, the susceptor elements 180 are located within the aerosol-forming substrate 20 of the aerosol-generating article. The fluctuating field generates eddy currents within the susceptor elements 180, which are heated as a result. Further heating is provided by magnetic hysteresis losses within the susceptor elements 180. The heated susceptor elements 180 heat the aerosol-forming substrate 20 of the aerosol-generating article 10 to a sufficient temperature to form an aerosol. The aerosol may then be drawn downstream through the aerosol-generating article 10 for inhalation by the user. Such actuation may be manually operated or may occur automatically in response to a user drawing on the aerosol-generating article 10, for example by using a puff sensor.

The aerosol-generating device may further comprise a flux concentrator (not shown) positioned around the inductor coil 130 and formed from a material having a high relative magnetic permeability so that the magnetic field produced by the inductor coil 130 is attracted to and guided by the flux concentrator. In this manner, the flux concentrator may limit the extent to which the magnetic field produced by the inductor coil 130 extends beyond the housing 110 and may increase the density of the magnetic field within the chamber 120. This may increase the current generated within the susceptor elements to allow for more efficient heating. Such a flux concentrator may be made from any suitable material or materials having a high relative magnetic permeability. For example, the flux concentrator may be formed from one or more ferromagnetic materials, for example a ferrite material, a ferrite powder held in a binder, or any other suitable material including ferrite material such as ferritic iron, ferromagnetic steel or stainless steel. The flux concentrator is preferably made from a material or materials having a high relative magnetic permeability. That is, a material having a relative magnetic permeability of at least 5 when measured at 25 degrees Celsius, for example, at least 10, at least 20, at least 30, at least 40, at least 50, at least 60, at least 80, or at least 100. These example values may refer to the relative magnetic permeability of the flux concentrator material for a frequency of between 6 and 8 MHz and a temperature of 25 degrees Celsius.

Figure 5:
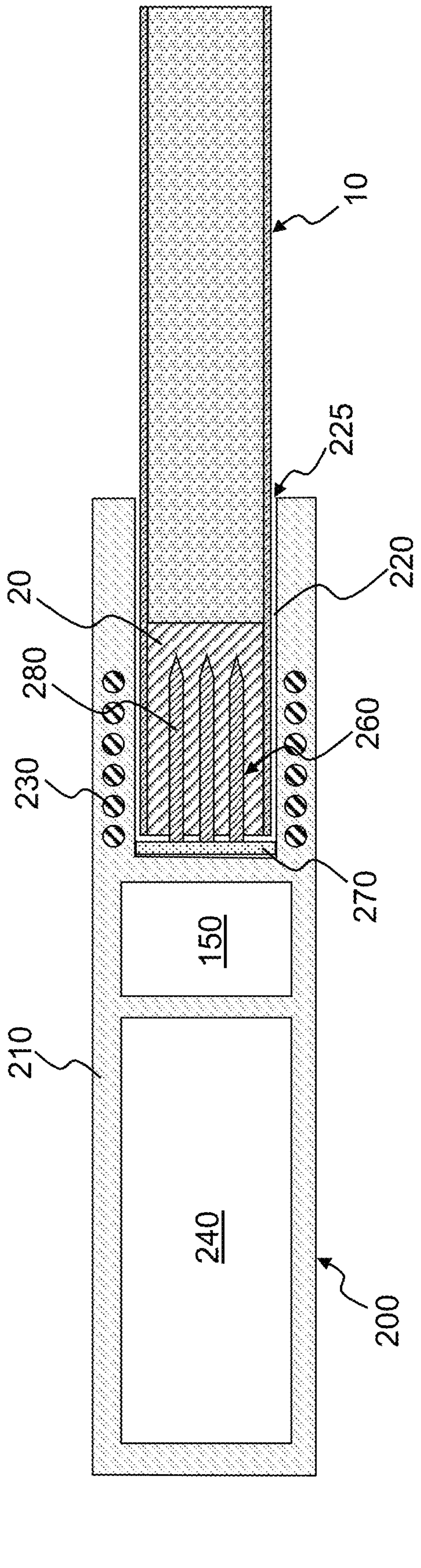
FIG. 5 is a schematic cross-sectional illustration of an aerosol-generating system in accordance with a second embodiment of the present invention.
Figure 6:
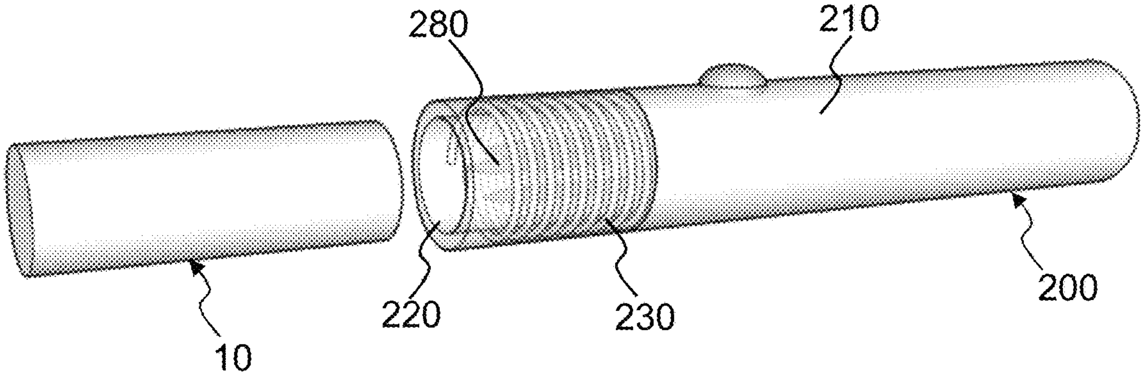
FIG. 6 is a perspective side view of the aerosol-generating system of FIG. 5, in which the inductor coil and the susceptor elements are also shown.
Figure 7:
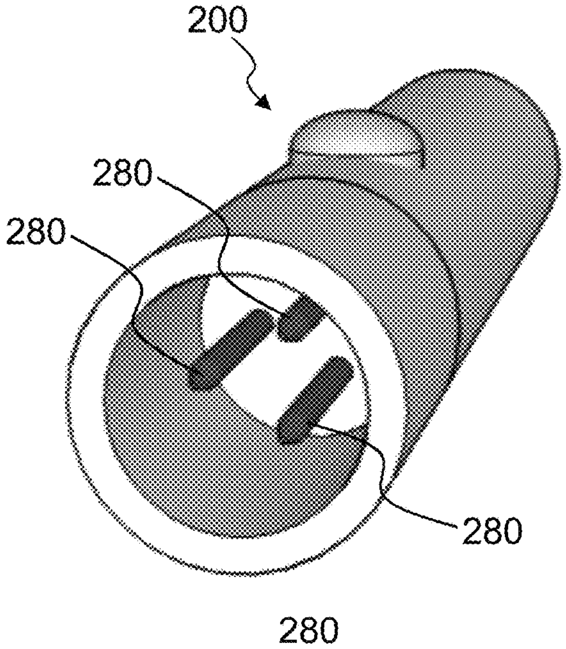
FIG. 7 is a perspective end view of the aerosol-generating system of FIG. 5.
Figure 8:
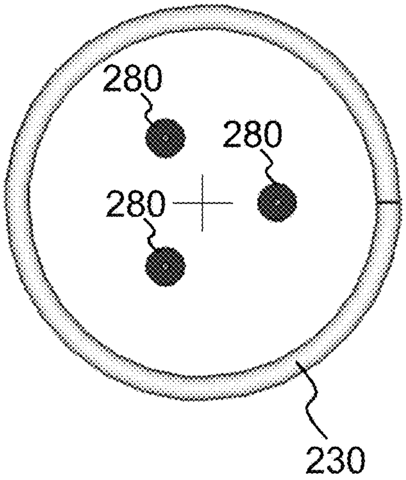
FIG. 8 is an end view of the inductor coil and susceptor elements of the aerosol-generating system of FIG. 5, with all other components omitted for clarity.

FIG. 5 shows a schematic cross-sectional illustration of an aerosol-generating system according to a second embodiment of the invention. The aerosol-generating system comprises an aerosol-generating device 200 according to a second embodiment and an aerosol-generating article 10 configured for use with the aerosol-generating device 200. FIG. 6, FIG. 7, and FIG. 8 show different views of the aerosol-generating device 200.

The aerosol-generating device 200 of the second embodiment is similar in construction and operation to the aerosol-generating device 100 of the first embodiment and where the same features are present, like reference numerals have been used. However, unlike the aerosol-generating device 100 of the first embodiment, the aerosol-generating device 200 has an inductor assembly 260 comprising three elongate susceptor elements 280 attached to the base portion 270. The three susceptor elements 280 are arranged in a regular pattern. In particular, the susceptor elements 280 are arranged such that each susceptor element 280 is positioned at the vertex of an equilateral triangle. In this manner, the plurality of elongate susceptor elements 280 are spaced apart both in a first transverse direction of the chamber and in a second traverse direction of the chamber which is perpendicular the first transverse direction. This means that the plurality of elongate susceptor elements 280 are spaced apart across the area of the chamber 120 and each extend along a different plane. This may result in more even heating of the aerosol-forming substrate of an aerosol-generating article received in the chamber.

Figure 9:
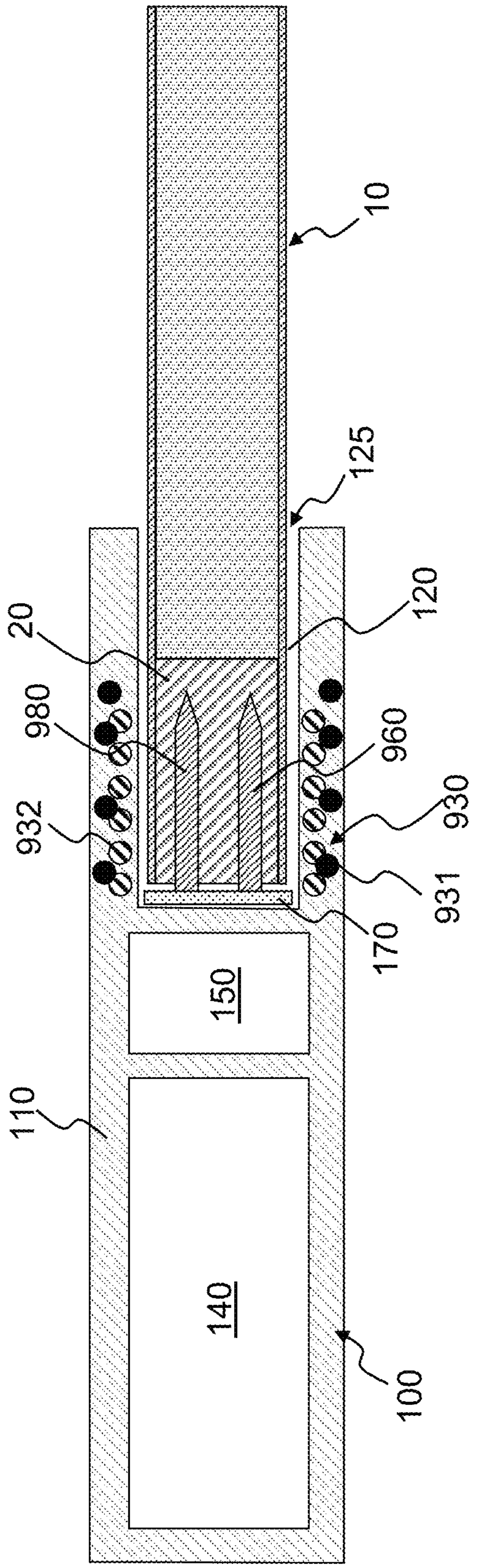
FIG. 9 is a schematic cross-sectional illustration of an aerosol-generating system in accordance with an embodiment of the present invention.
Figure 10:
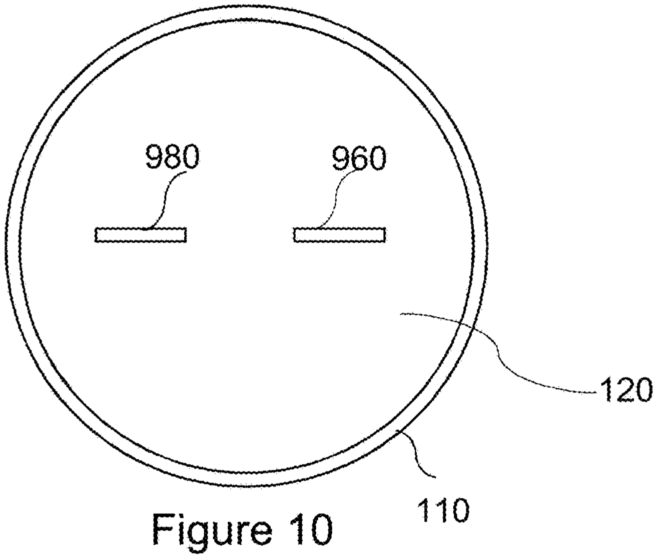
FIG. 10 is a schematic end view showing one possible susceptor configuration for the aerosol-generating system of FIG. 9.

FIG. 9 shows a schematic cross-sectional illustration of an aerosol-generating system according to an embodiment of the invention. The embodiment illustrated in FIG. 9 is similar to the embodiment described above in relation to FIG. 1. Accordingly, components of the system that are the same as described above in relation to FIG. 1 have been given the same reference numerals and the relevant description has not been repeated. FIG. 10 shows an end view of the aerosol-generating device 100 of FIG. 9 revealing the configuration of the two susceptors 960, 980.

The embodiment of FIG. 9 differs from the embodiment of FIG. 1 in that the aerosol-generating device 100 comprises an induction element 930 having two separately actuatable induction coils. A first induction coil 931 is configured to generate an alternating magnetic field having a frequency of between 3 and 5 MHz and a second induction coil 932 is configured to generate an alternating magnetic field having a frequency of between 7 and 10 MHz. The first induction coil 931 and the second induction coil 932 are linked to the controller 150 and can be separately and sequentially actuated.

The aerosol-generating device further comprises two elongate susceptor elements 960, 980 arranged to project into the chamber. The first susceptor element 960 is configured to heat more efficiently than the second susceptor element 980 when the first induction coil 931 is actuated. Thus, the first susceptor element is configured to heat to a temperature greater than 300 degrees Centigrade when the first induction coil 931 is actuated whereas the second susceptor element is configured to heat to a temperature lower than 300 degrees Centigrade when the first induction coil is activated. In use, this means that aerosol may be generated from an aerosol-forming substrate in proximity to the first susceptor element but not from a portion of aerosol-forming substrate in proximity to the second susceptor element. Conversely, the second susceptor element 980 is configured to heat more efficiently than the first susceptor element 960 when the second induction coil 932 is actuated. Thus, the second susceptor element is configured to heat to a temperature greater than 300 degrees Centigrade when the second induction coil 932 is actuated whereas the first susceptor element is configured to heat to a temperature lower than 300 degrees Centigrade when the second induction coil is activated. In use, this means that aerosol may be generated from an aerosol-forming substrate in proximity to the second susceptor element but not from a portion of aerosol-forming substrate in proximity to the first susceptor element.

By sequentially actuating the first susceptor element and the second susceptor element, a sequential heating of different portions of an aerosol forming substrate may be achieved.

There are a number of parameters that may be altered to tune each susceptor element to operate more efficiently at any particular frequency of alternating magnetic field. For example, the shape, size, magnetic permeability and resistivity may all be altered to change the manner in which eddy currents are generated within the susceptor and the efficiency of heating.

As an example, FIG. 10 illustrates an end view of two susceptors 960 and 980. These susceptors are shaped as elongate blades having a longitudinal dimension that is greater than a width dimension, which is greater than a thickness dimension. The longitudinal dimension is 10 mm, the width dimension is 3 mm, and the thickness dimension is 1 mm. The first susceptor 960 may be formed from grade 430 stainless steel and the second susceptor may be formed from a graphite material.

Figure 11:
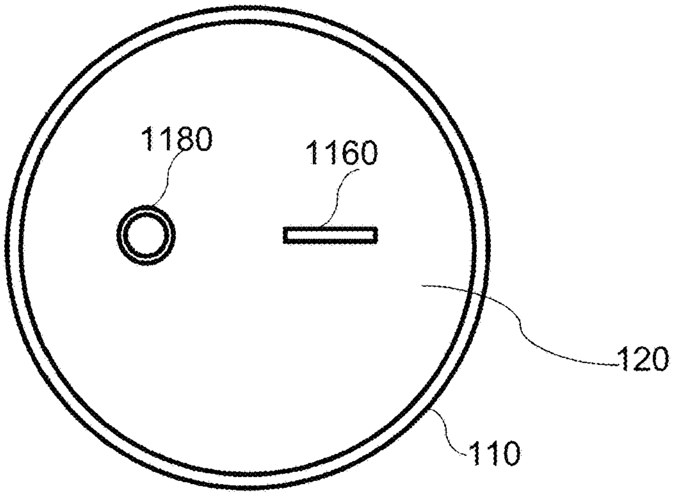
FIG. 11 is a schematic end view showing a further possible susceptor configuration for the aerosol-generating system of FIG. 9.
Figure 12:
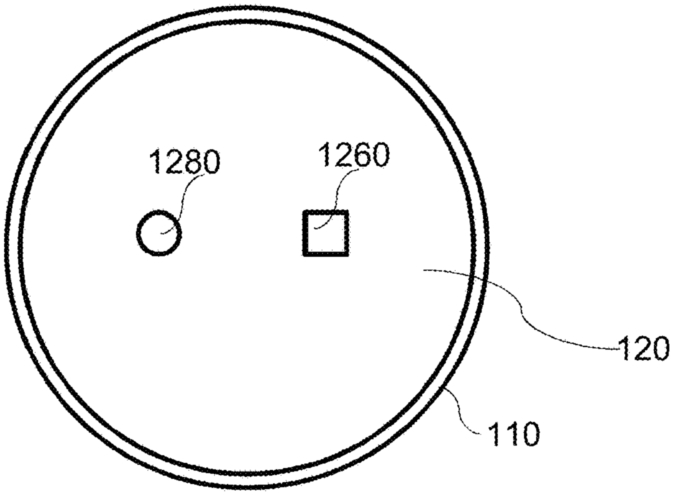
FIG. 12 is a schematic end view showing a further possible susceptor configuration for the aerosol-generating system of FIG. 9.

Further examples of different configurations of susceptor elements are shown in FIGS. 11 and 12. In FIG. 11 a first susceptor 1160 is formed from an elongated blade of grade 430 stainless steel and a second susceptor 1180 is formed from an elongate tube of grade 430 stainless steel. In FIG. 12 a first susceptor 1260 is formed from an elongated square-cross-section rod of aluminium and a second susceptor 1280 is formed from an elongate circle-cross-section rod of aluminium.

Figure 13:
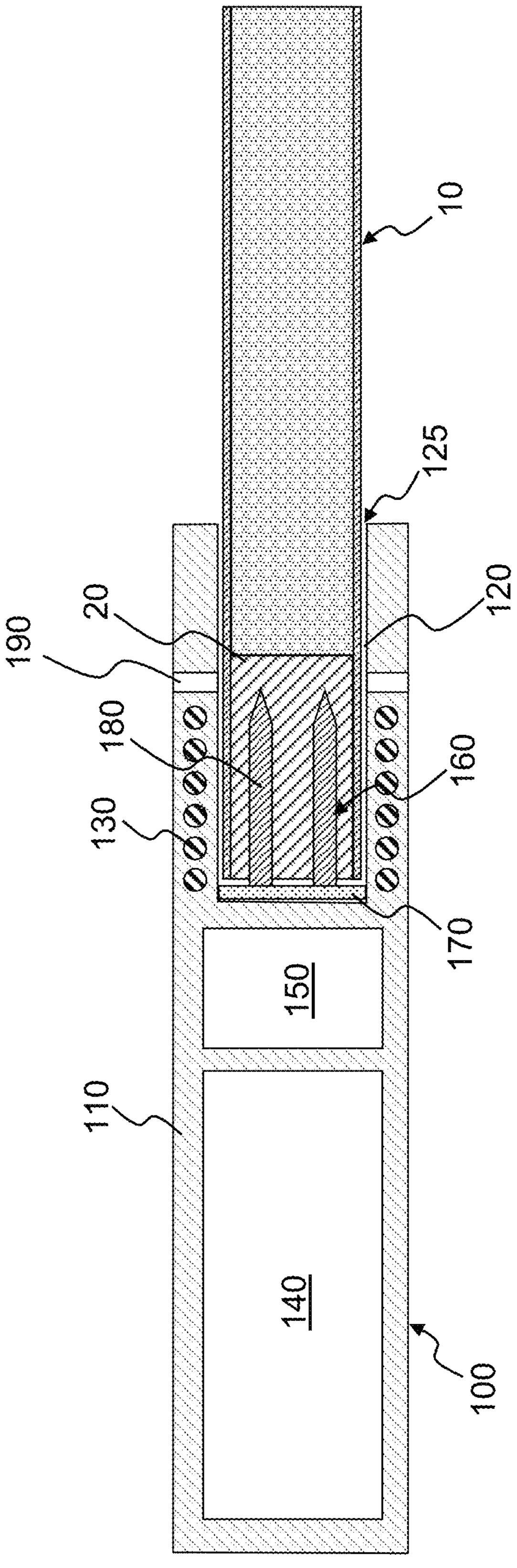
FIG. 13 is a schematic cross-sectional view of an aerosol-generating system in accordance with an embodiment of the present invention.

FIG. 13 shows a schematic cross-sectional view of an aerosol-generating system according to an embodiment of the invention. The embodiment illustrated in FIG. 13 is similar to the embodiment described above in relation to FIG. 1. Accordingly, components of the system that are the same as described above in relation to FIG. 1 have been given the same reference numerals and the relevant description has not been repeated. The embodiment of FIG. 13 differs from the embodiment of FIG. 1 in that ventilation holes 190 are provided in the walls of the housing 110 to allow airflow into the chamber 120.

The skilled person could vary size, shape, and material to form different susceptor elements that produce different heating responses to alternating magnetic fields of differing frequencies.

The exemplary embodiments described above are not intended to limit the scope of the claims. Other embodiments consistent with the exemplary embodiments described above will be apparent to those skilled in the art.

The invention claimed is:

1. An aerosol-generating system, comprising:

an aerosol-generating device, comprising
- a housing comprising ventilation holes,
- a heating chamber defining a heating zone and being sized to receive at least a portion of an aerosol-forming substrate within the heating zone,
- an induction element disposed around, or adjacent to, the heating zone,
- a power supply, and
- a controller connected to the induction element and configured to provide an alternating electric current to the induction element to generate an alternating magnetic field within the heating zone, wherein the induction element is configured to be controlled to sequentially provide a first alternating magnetic field having a first frequency for a first period of time followed by a second alternating magnetic field having a second frequency for a second period of time.

2. The aerosol-generating system according to claim 1, wherein the first alternating magnetic field causes preferential heating of a first susceptor disposed within the heating zone and the second alternating magnetic field causes preferential heating of a second susceptor disposed within the heating zone.

3. The aerosol-generating system according to claim 2, wherein, during the first period of time the first susceptor is heated to a higher temperature than the second susceptor and during the second period of time the second susceptor is heated to a higher temperature than the first susceptor, or during the first period of time the second susceptor is heated to a higher temperature than the first susceptor and during the second period of time the first susceptor is heated to a higher temperature than the second susceptor.

4. The aerosol-generating system according to claim 1, wherein the induction element is further configured to be controlled to provide three or more different alternating magnetic fields for three or more separate periods of time, each of the three or more different alternating magnetic fields having a different frequency.

5. The aerosol-generating system according to claim 2, wherein the aerosol-generating device comprises the first susceptor and the second susceptor.

6. The aerosol-generating system according to claim 2, wherein the aerosol-generating device further comprises a plurality of elongate susceptor elements projecting into the chamber, the plurality of elongate susceptor elements extending in a longitudinal direction of the chamber and being spaced apart from each other, and the plurality of elongate susceptor elements comprising at least the first susceptor and the second susceptor.

7. The aerosol-generating system according to claim 6, wherein the plurality of elongate susceptor elements are substantially parallel with each other.

8. The aerosol-generating system according to claim 5, wherein the first susceptor and the second susceptor, or each of the plurality of elongate susceptor elements, are removably attached to the aerosol-generating device.

9. The aerosol-generating system according to claim 8, further comprising the first susceptor and the second susceptor, or the plurality of elongate susceptor elements, and a base portion configured to removably attach to the housing of the aerosol-generating device, wherein the first susceptor and the second susceptor, or the plurality of elongate susceptor elements, are attached to the base portion such that the first susceptor and the second susceptor, or the plurality of elongate susceptor elements, project into the heating chamber when the base portion is removably coupled to the housing.

10. The aerosol-generating system according to claim 1, further comprising an aerosol-generating article, the aerosol-generating article comprising the aerosol-forming substrate and being dimensioned to be received by the heating chamber such that at least a portion of an aerosol-forming substrate is within the heating zone.

11. The aerosol-generating system according to claim 2, further comprising an aerosol-generating article, the aerosol-generating article comprising the aerosol-forming substrate and being dimensioned to be received by the heating chamber such that at least a portion of an aerosol-forming substrate is within the heating zone, the aerosol-generating article further comprising the first susceptor and the second susceptor.

12. The aerosol-generating system according to claim 2, wherein the first susceptor has a first shape, a first cross-section, a first length dimension, a first width dimension, and a first thickness dimension, and the second susceptor has a second shape, a second cross-section, a second length dimension, a second width dimension, and a second thickness dimension, and wherein at least one of the first and the second shape, the first and the second cross-section, the first and the second length dimension, the first and the second width dimension, and the first and the second thickness dimension, are different.

13. The aerosol-generating system according to claim 2, wherein the first susceptor is formed from a first material and the second susceptor is formed from a second material, wherein the first material has one or more material properties different from that of the second material, and wherein the one or more material properties comprises resistivity and magnetic permeability.

14. The aerosol-generating system according to claim 1, wherein the induction element is a single coil configured to provide both the first alternating magnetic field and the second alternating magnetic field, or wherein the induction element comprises a first coil and a second coil, the first coil being actuatable to provide the first alternating magnetic field and the second coil being actuatable to provide the second alternating magnetic field.

15. A method of using an aerosol-generating system as recited in claim 1, the method comprising:

inserting the aerosol-generating article into the heating chamber of the aerosol-generating device such that at least a portion of an aerosol-forming substrate is located within the heating zone;

actuating the induction element to provide a first alternating magnetic field having a first frequency for a first period of time, thereby preferentially heating a first susceptor located within the heating zone for the first period of time; and actuating the induction element to provide a second alternating magnetic field having a second frequency for a second period of time, thereby preferentially heating a second susceptor located within the heating zone for the second period of time, wherein a first portion of the aerosol-forming substrate is heated by the first susceptor during the first period of time, and a second portion of the aerosol-forming substrate is heated by the second susceptor during the second period of time.

* * * * *